US012673470B2

(12) United States Patent　　　(10) Patent No.:　US 12,673,470 B2
Singh et al.　　　　　　　　　　　(45) Date of Patent:　　Jul. 7, 2026

(54) SYSTEMS AND METHODS FOR CONCURRENT REACTION-BONDED JOINING AND DENSIFICATION

(71) Applicant: UCHICAGO ARGONNE, LLC, Chicago, IL (US)

(72) Inventors: Dileep Singh, Naperville, IL (US); Wenchao Du, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 179 days.

(21) Appl. No.: 18/375,331

(22) Filed: Sep. 29, 2023

(65) Prior Publication Data

US 2025/0108568 A1　　　Apr. 3, 2025

(51) Int. Cl.
　　*B29C 65/48*　　　(2006.01)
　　*B23P 15/26*　　　(2006.01)
　　*B29L 31/18*　　　(2006.01)
(52) U.S. Cl.
　　CPC ............ *B29C 65/484* (2013.01); *B23P 15/26* (2013.01); *B29L 2031/18* (2013.01)
(58) Field of Classification Search
　　CPC .... B29C 65/484; B23P 15/26; B29L 2031/18; C04B 37/005; C04B 37/003; C04B 2237/61
　　See application file for complete search history.

(56) References Cited

U.S. PATENT DOCUMENTS

| | | | |
|---|---|---|---|
| 11,273,607 B2 | 3/2022 | Olausson et al. | |
| 2009/0280299 A1* | 11/2009 | Ferrrato | B23K 1/0012 |
| | | | 428/157 |
| 2018/0326484 A1 | 11/2018 | Bonilla Gonzalez et al. | |
| 2022/0168950 A1 | 6/2022 | Yu et al. | |

FOREIGN PATENT DOCUMENTS

WO　　WO-2021069722 A1 *　4/2021　........... C04B 35/563

OTHER PUBLICATIONS

Machine Translation of WO2021/069722 (Year: 2021).*
Abdulhameed, et al., "Additive manufacturing: Challenges, trends, and applications," Advances in Mechanical Engineering 11(2), pp. 1-27 (2019).
Du, et al., "Additive manufacturing and testing of a ceramic heat exchanger for high-temperature and high-pressure applications for concentrating solar power," Solar Energy 236, pp. 654-665 (2022) (26 page accepted manuscript provided).
Du, et al., "Ceramic Binder Jetting Additive Manufacturing: A Literature Review on Density," Journal of Manufacturing Science and Engineering 142(4):040801, 19 pages (2020).
Ferraris, et al., "Effects of neutron irradiation on glass ceramics as pressure-less joining materials for SiC based components for nuclear applications," Journal of Nuclear Materials 429(1-3), pp. 166-172 (2012).

(Continued)

*Primary Examiner* — Daniel Mcnally
(74) *Attorney, Agent, or Firm* — Foley & Lardner LLP

(57) ABSTRACT

A method can include providing two or more parts. The two or more parts can include a first part and a second part. The method can include disposing a source material between the first part and the second part. The method can include joining and densifying the first part and the second part by reacting a liquid with the source material.

20 Claims, 16 Drawing Sheets

(56) References Cited

OTHER PUBLICATIONS

Gottselig, et al., "Joining of ceramics demonstrated by the example of SiC/Ti," Journal of the European Ceramic Society 6(3), pp. 153-160 (1990).

Kim, et al., "Joining of silicon carbide ceramics using a silicon carbide tape," International Journal of Applied Ceramic Technology 16(4), pp. 1295-1303 (2019).

Kowen, "Powder removal: The Achilles heel of powder bed-based metal Additive Manufacturing," Metal AM 5(2), pp. 119-126 (2019).

Li, et al., "Metal Binder Jetting Additive Manufacturing: A Literature Review," Journal of Manufacturing Science and Engineering 142(9):090801, 45 pages (2020).

Liu, et al., "Joining of sintered silicon carbide using ternary Ag%u2013Cu%u2013Ti active brazing alloy," Ceramics International 35(8), pp. 3479-3484 (2009).

Liu, et al., "Recent advances in joining of SiC-based materials (monolithic SiC and SiCf/SiC composites): Joining processes, joint strength, and interfacial behavior," Journal of Advanced Ceramics 8, pp. 19-38 (2019).

Luo, et al., "Development of SiC%u2013SiC joint by reaction bonding method using SiC/C tapes as the interlayer," Journal of the European Ceramic Society 32(14), pp. 3819-3824 (2012).

Panchuagnula & Simhambhatla, "Additive Manufacturing of Complex Shapes Through Weld-Deposition and Feature Based Slicing,"

ASME 2015 International Mechanical Engineering Congress and Exposition:IMECE2015-51583, V02AT02A004, 7 pages (2015).

Rabin, "Joining of fiber-reinforced SiC composites by in situ reaction methods," Materials Science and Engineering: A 130(1), pp. L1-L5 (1990).

Rabin, "Modified Tape Casting Method for Ceramic Joining: Application to Joining of Silicon Carbide," Journal of the American Ceramic Society 73(9), pp. 2757-2759 (1990).

Singh, "A reaction forming method for joining of silicon carbide-based ceramics," Scripta Materialia 37(8), pp. 1151-1154 (1997).

Singh, "Joining of sintered silicon carbide ceramics for high-temperature applications," Journal of Materials Science Letters 17, pp. 459-461 (1998).

Sung, et al., "Joining of reaction bonded silicon carbide using self-infiltration of residual Si present in the RBSC," Ceramics International 46(18A), pp. 28800-28805 (2020).

Utley, "An Introduction to Designing for Metal 3D Printing," The SOLIDWORKS Blog, retrieved from https://blogs.solidworks.com/solidworksblog/2017/06/introduction-designing-metal-3d-printing.html on Sep. 25, 2023, 5 pages (2017).

Wu, et al., "Joining of SiC Ceramic by Si—C Reaction Bonding Using Organic Resin as Carbon Precursor," Materials 15(12):4242, 10 pages (2022).

Zheng, et al., "Green State Joining of Silicon Carbide Using Polycarbosilane," Journal of the American Ceramic Society 83(7), pp. 1687-1692 (2000).

* cited by examiner

900

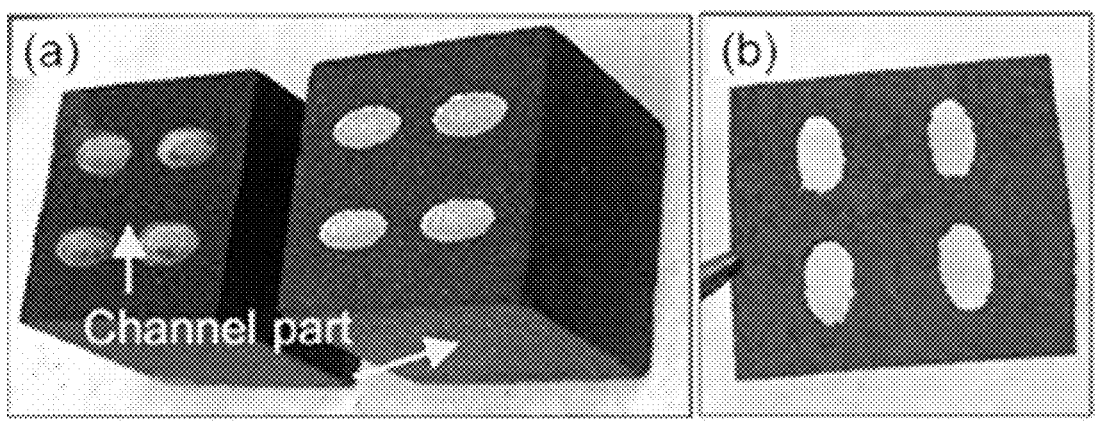
FIG. 14A                    FIG. 14B
FIG. 14D
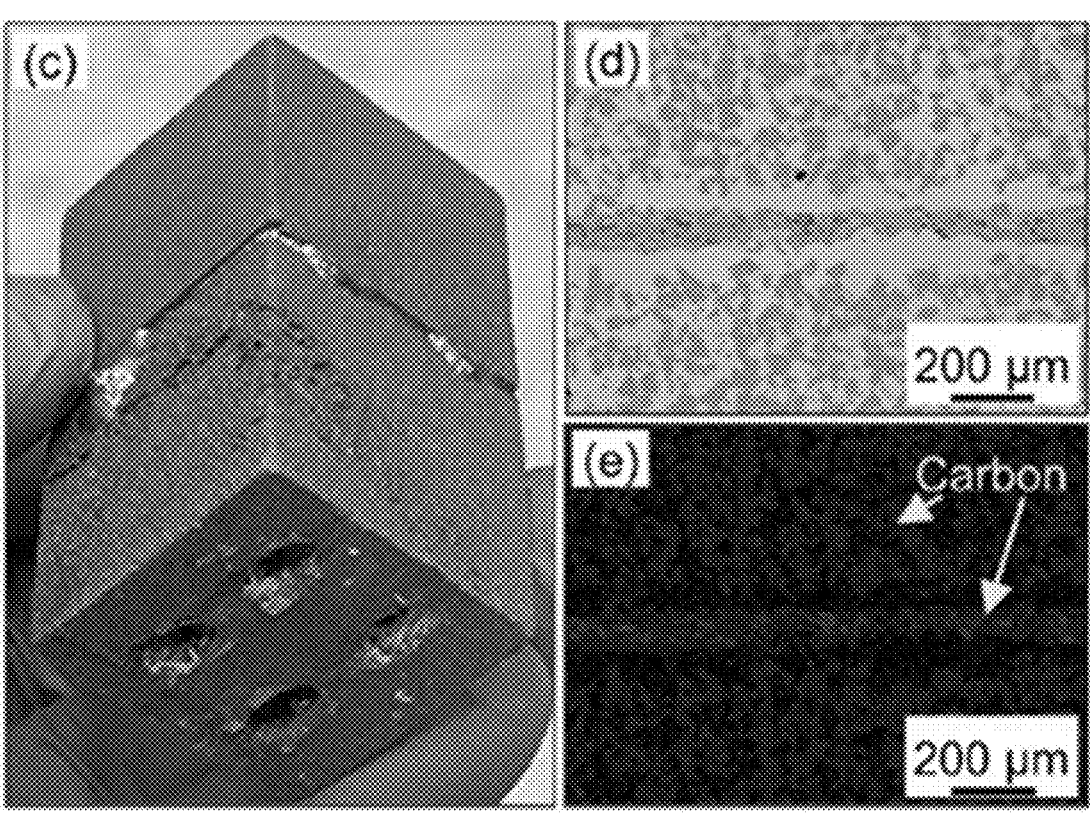
FIG. 14C                    FIG. 14E

SYSTEMS AND METHODS FOR CONCURRENT REACTION-BONDED JOINING AND DENSIFICATION

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to concurrent reaction-bonded joining and densification of components.

BACKGROUND

Additive manufacturing or 3D printing can be used to construct objects.

SUMMARY

The systems and methods of the present disclosure are directed to concurrent reaction-bonded joining and densification of components. The components can be formed via additive manufacturing. The components can be joined by an interface layer. The interface layer can have the same composition as that of the components.

One aspect of the present disclosure is directed to a method. The method can include providing two or more parts. The two or more parts can include a first part and a second part. The method can include disposing a source material between the first part and the second part. The method can include joining and densifying the first part and the second part by reacting a liquid with the source material.

Another aspect of the present disclosure is directed to a system. The system can include two or more parts. The two or more parts can include a first part. The first part can include silicon carbide. The two or more parts can include a second part. The second part can include silicon carbide. The second part can be coupled with the first part. The system can include a joining layer disposed between the first part and the second part. The joining layer can include one or more layers of silicon. The joining layer can include one or more layers of silicon carbide.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIGS. 14A-14E show channeled samples, according to an example implementation.

Figure 1:
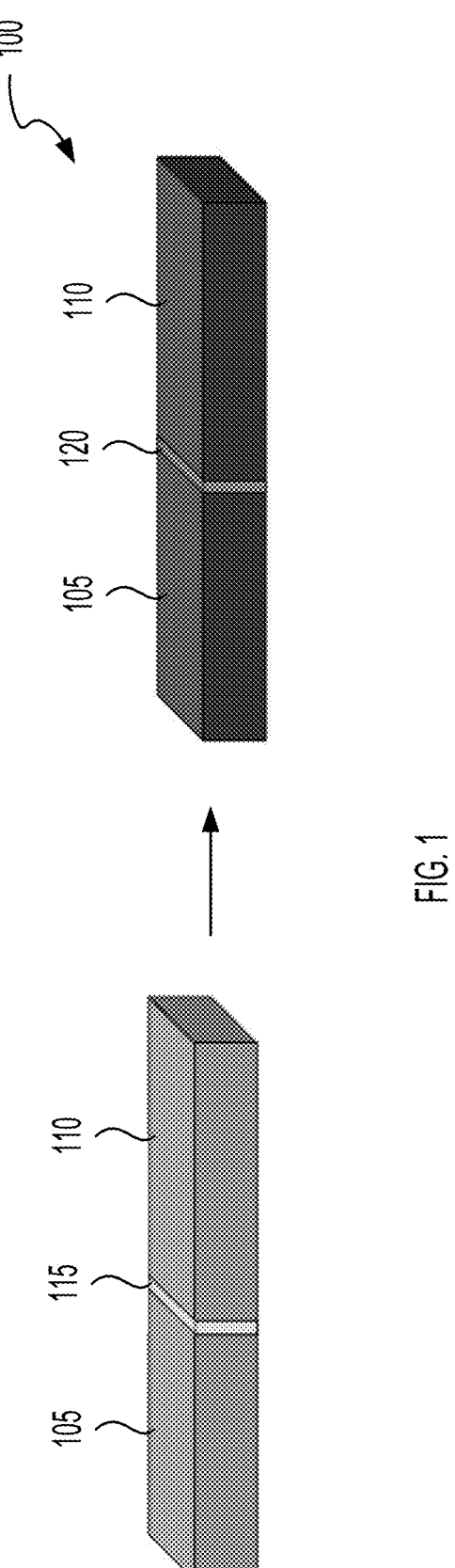
FIG. 1 shows a process of concurrent reaction-bonded joining and densification, according to an example implementation.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Before turning to the figures, which illustrate certain exemplary embodiments in detail, it should be understood that the present disclosure is not limited to the details of methodology set forth in the description or illustrated in the figures. It should also be understood that the terminology used herein is for the purpose of description only and should not be regarded as limiting.

Silicon carbide (SiC) and SiC-based composites can be used in a wide range of applications due to their excellent properties in terms of strength, heat transfer, thermal stability, wear-resistance, etc. Methods for fabricating SiC can include hot-pressing, pressure-less sintering, chemical vapor deposition, and reaction-bonding. The reaction-bonded silicon carbide (RBSC) process can include SiC preform fabrication, carbon introduction by a polymer infiltration/pyrolysis process, and subsequent silicon melt infiltration. The resultant part can be dense and can have a near-net shape. In addition to the attractive properties of RBSC, the processing time of RBSC can be relatively short and the temperature can be relatively low compared with other sintering methods.

Joining SiC-based materials can be necessary when fabricating and/or machining are of high cost. For SiC-based materials with large and/or complex geometries, joining can be an alternative and cost-effective fabrication method. Joining technologies can include metal brazing, diffusion bonding, glass sealing, polymer-derived ceramic joining, SiC reaction-bonded joining, etc. Selecting an appropriate technology can be critical for a successful joining. Metal melting infiltration can form a metal layer at the interface between two components, which can limit the joining properties. Reaction-bonded joining of SiC-based materials can include using pre-densified SiC preforms for the joining.

Additive manufacturing (AM) can be used in many applications, such as for the manufacturing of components with complex geometries. However, there are still some geometry limitations for additively-manufactured parts. For example, powder-bed-based AM technologies such as binder jetting and powder bed fusion cannot fabricate closed hollow geometries. Direct energy deposition and powder bed fusion can be limited by large overhangs or undercuts. In such cases, joining could be a promising approach to further improve the design freedom and widen the application scenarios of AM.

Described herein are systems, methods, and apparatuses related to concurrent reaction-bonded joining and densification of components. The components can include, for example, additively manufactured silicon carbide. The concurrent reaction-bonded joining and densification of components can be achieved using liquid silicon infiltration. The method can include slicing a design into several parts, printing and de-powdering each part separately, and then joining the parts while concurrently densifying the material. The bonding approach can include a SiC reaction. SiC or C (e.g., SiC paper, SiC particles, C paper, C particles) can be added to the interface. A liquid silicon infiltration technique can be used to form the joint. The paper can be used as an interface carbon source, which can formulate a ceramic phase in the interface and thereby strengthen the joint. The method can apply to powder-based 3D printing technologies (e.g., binder jetting, powder bed fusion, etc.) and can be used to join components made of powders (e.g., metal powders, ceramic powders, polymer powders, sand, etc.).

The method can enable complex geometries (e.g., hollow structures, passages, tunnels, chambers) and/or large-scale part fabrication for ceramic additive manufacturing and for powder-bed based additive manufacturing processes (e.g., de-powdering before joining). The method can be tunable for joining interfaces that enhance joining strength by forming a ceramic phase in the interface. The method can be economical by improving the efficiency of the fabrication processes of ceramic additive manufacturing (e.g., concurrent densification and joining).

Reaction-bonded joining can include adding SiC (e.g., silicon carbide) and/or C (e.g., carbon) into an interlayer between components and liquid silicon infiltration to form the joint between the components. The interface can have a similar composition to its base material (e.g., SiC/Si composite), which can be beneficial for structural and property homogeneity. The microstructure of the reaction-bonded interface layer can be tuned by using different compositions (e.g., material ratios) or forms (e.g., slurry, tape, powder, etc.) of interlayer materials to meet specific requirements. Moreover, the cost and processing temperature of reaction-bonded joining can be relatively low.

The method can include concurrently joining and densifying additively manufactured silicon carbide preforms by reaction bonding via liquid silicon infiltration. Silicon carbide disks can be printed by binder jetting technology, debound to introduce carbon, and then infiltrated by liquid silicon. Graphite paper and/or parchment paper can be introduced into the interface. A robust interface with a range of thickness of 150 μm to 500 μm can be formed. High-energy synchrotron X-ray can reveal that β-phase silicon carbide was formed inside the interface. Two additively manufactured channeled samples can be joined.

FIG. 1 shows a process 100 of concurrent reaction-bonded joining and densification. Concurrent reaction-bonded joining and densification can include reaction-bonded joining and densification occurring at the same time. Joining can be needed for parts with large-scale geometry and/or complex design. Densification can be need for parts formed via additive manufacturing. The process 100 can include providing two or more parts (e.g., components). The two or more parts can include a first part 105 and a second part 110. The process 100 can include disposing a source material 115 (e.g., interface material) between the first part 105 and the second part 110. The process 100 can include joining and densifying the first part 105 and the second part 110 by reacting a liquid with the source material 115. The liquid can react with the source material 115 to form a joint (e.g., interface layer, joining layer 120) at the interface between the first part 105 and the second part 110. The source material 115 can include paper or particles.

EXPERIMENTAL METHODS

Sample Preparation

A SiC powder with a particle size of 10 μm can be used as the feedstock powder for sample printing. The powder particle size distribution can be measured by a particle size analyzer. Particle morphology can be characterized by a scanning electron microscope.

Figures 2A, 2B, 2C:
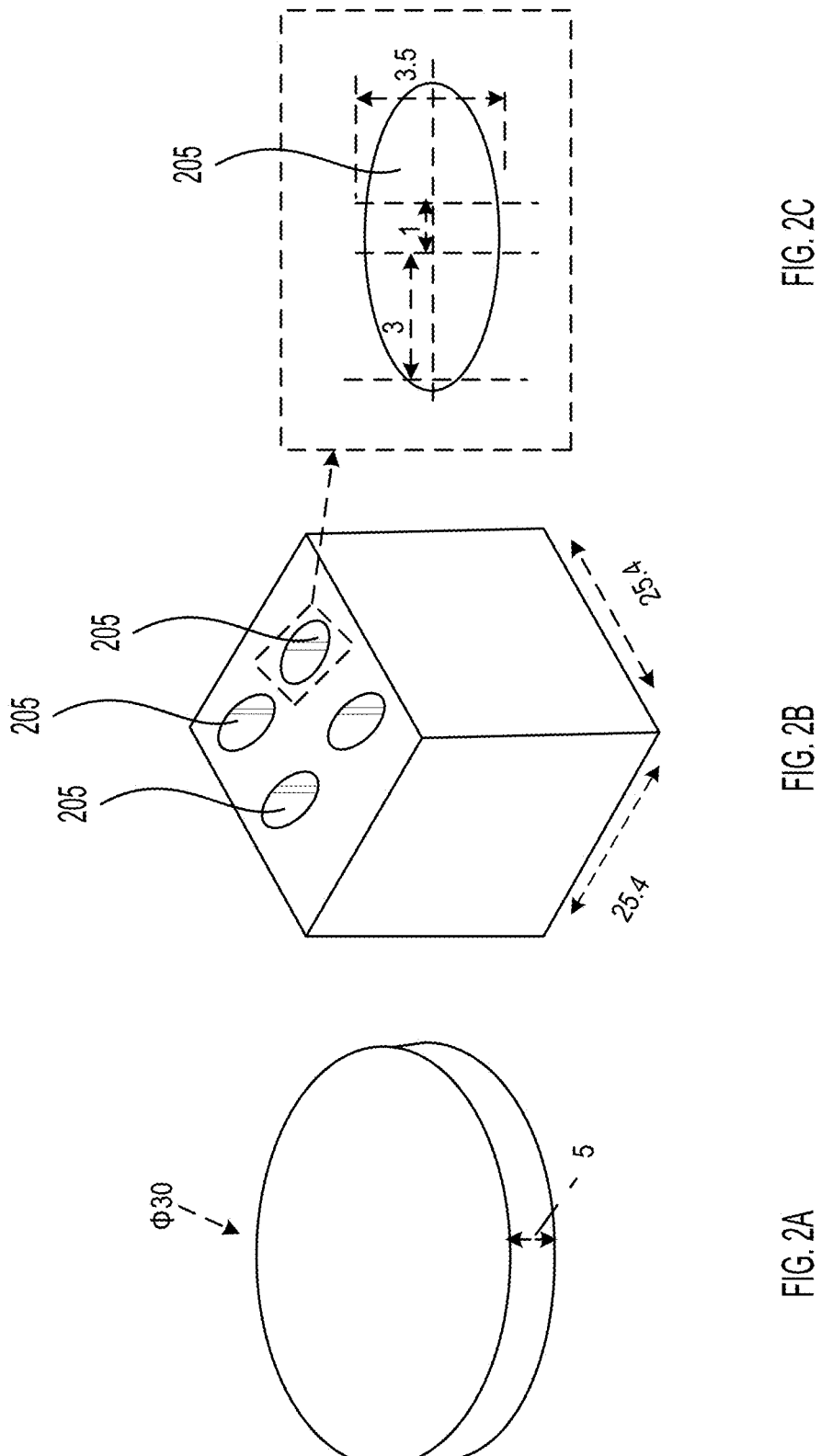
FIGS. 2A-2C show designs of samples for joining, according to an example implementation.

FIGS. 2A-2C show designs of samples (e.g., printed samples, 3D printed samples, additively manufactured samples) for joining. FIG. 2A shows a disk sample. FIG. 2B shows a channeled sample (e.g., a sample with one or more channels 205). FIG. 2C shows the channel dimension for the channeled sample in FIG. 2B. The units are in millimeters. A binder jetting 3D printer can be used for sample printing. The binding material can include a phenolic binder. The binder can have a composition of phenol (2.5% to 15%), formaldehyde (<0.5%), and isopropyl alcohol. The printing parameters are shown in Table 1. After printing, the building box (with printed samples inside) can be placed in an oven for curing at 180° C. for 8 hours. Then the samples inside the loose powder of the build box can be carefully de-powdered using a brush and an air blaster. Densities of the printed disk samples can be obtained by dimension measuring. After this, debinding in an argon atmosphere can be conducted for all printed samples at 550° C. During debinding, the phenolic binder can be decomposed into various components, finally leaving amorphous carbon inside the sample.

Table 1 shows the printing parameters for binder jetting additive manufacturing.

| Category | Parameter (unit) | Value |
| --- | --- | --- |
| Powder dispensing | Dispense on delay (s) | 2.5 |
| Powder dispensing | Ultrasonic intensity (%) | 50 |
| Powder dispensing | Recoater speed (mm/s) | 30 |
| Powder spreading | Roller rotation speed (rpm) | 300 |
| Powder spreading | Roller traverse speed (mm/s) | 3 |
| Powder bed formation | Layer thickness (μm) | 50 |
| Powder bed formation | Powder bed temperature (° C.) | 60 |
| Powder bed formation | Powder bed drying time (s) | 8 |
| Binder | Desired saturation (96) | 55 |
| Binder | Binder set time (s) | 5 |
| Binder | Drying time (s) | 16 |
| Binder | Printhead scanning speed (mm/s) | 150 |

Joining of Disk Samples.

Table 2 lists six joining experimental tests for disk samples. Two kinds of papers (e.g., graphite paper and parchment paper) can be introduced into the interface with different numbers of paper layers. The graphite paper can have a layer thickness of 90 μm. The parchment paper can include a weighing paper. The parchment paper can have a layer thickness of about 25 μm. Both of these two kinds of papers can act as a carbon source during liquid silicon infiltration for the formation of silicon carbide at the interface.

Table 2 shows the joining of disk samples by liquid silicon infiltration.

| Paper | Number of paper layers | Si powder added |
| --- | --- | --- |
| Graphite | 1 | Yes |
| Graphite | 2 | Yes |
| Graphite | 3 | Yes |
| Parchment | 1 | No |
| Parchment | 2 | No |
| Parchment | 3 | No |
| Parchment | 5 | No |

Figure 3A:
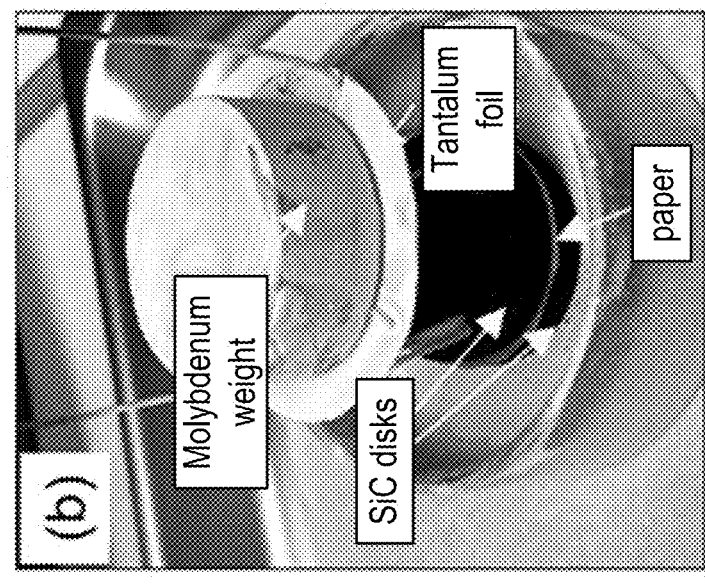
FIGS. 3A and 3B show a schematic and a photo of the setup for joining SiC disks by liquid silicon infiltration, according to an example implementation.
Figure 3B:
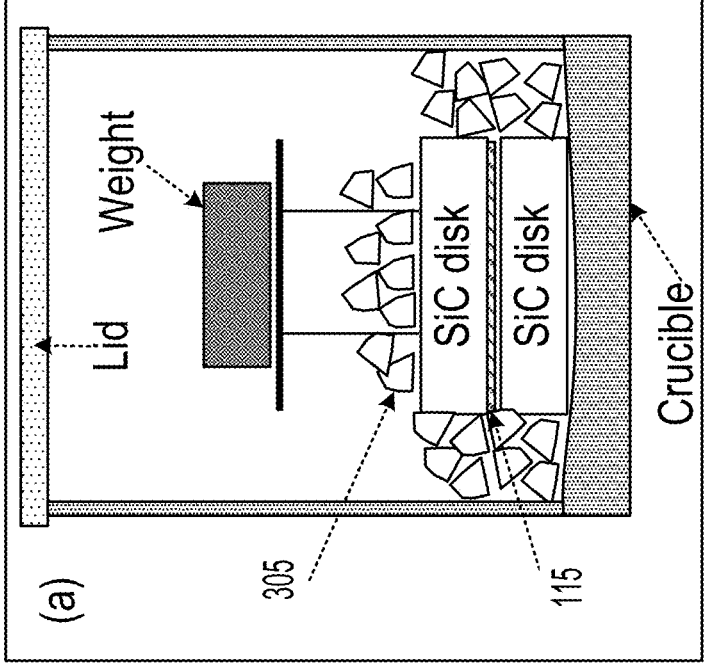

FIGS. 3A and 3B show the schematic and photo of the setup for disk joining. FIG. 3A shows a schematic of the setup for joining SiC disks by liquid silicon infiltration. FIG. 3B shows a photo of the setup for joining SiC disks by liquid silicon infiltration. A graphite crucible coated with boron nitride can be used. Weight can be added for all experiments. The weight can include a molybdenum disk with a mass of about 100 g, resting on a stage made from tantalum foil and tantalum wire. The weight can provide a force for densification. Moreover, some silicon powder with a particle size range of 1 μm to 5 μm can be carefully brushed to both surfaces of the graphite paper (e.g., source material 115). The added silicon powder for one piece of graphite paper can have a molar ratio (compared to that of the graphite paper) of about 1:3.

The liquid silicon infiltration can be conducted in a vacuum casting machine at 1550° C. with a dwell time of 2 hours. The heating rate can be 10° C./min. The vacuum level can be about $10^{-2}$ mbar. The silicon powder 305 can be heated such that the silicon powder melts and forms a liquid. The liquid can react with the source material 115 to form a joint between the two or more parts. For example, the liquid can react with the source material 115 to form a joint between the first part 105 and the second part 110. The liquid can react with the source material 115 to form a joint at the interface between the first part 105 and the second part 110. The liquid can include an infiltrant. The infiltrant can include aluminum, copper, magnesium, zirconia, metal, and/or metal alloys (e.g., aluminum-based alloys, copper-based alloys). The liquid can react with the source material 115. The liquid can react with the source material 115 to form a material that has the same composition as that of the two or more parts. The liquid can react with the source material 115 to form a material (e.g., formed material) that has the same composition as the matrix material (e.g., in the first part 105 and the second part 110). The formed material can adhere to the two or more parts. For example, the formed material can adhere to the first part 105. The formed material can adhere to the second part 110. The liquid can penetrate into the pores of the two or more parts. After cooling and subsequent solidification, this infiltrant material can bond the two or more parts together. The infiltrant can bond the particles inside the matrix. After infiltration, all samples can be cut to characterize the interface by optical microscopy and scanning electron microscopy (SEM) with capabilities of back-scattered electron (BSE) and energy dispersive spectroscopy (EDS).

High-energy synchrotron X-ray crystallography can be conducted for one joined disk sample from Test G3 in Advanced Photon Source (Sector 33) at Argonne National Laboratory. The X-ray energy can be 20.0 keV and beam size can be about 30 μm. The scanning 2θ range can be 6° to 40°.

To assess the joint quality, a micro computed tomography (micro-CT) assessment of the joined interface (in the disk sample from Test G3) can be performed by via utilization of Nikon XT H 225 ST with a resolution of 9.6 μm.

Experimental Results and Discussion

Powder Characterization and Prepared Samples.

Figures 4A, 4B, 4C, 4D, 4E, 4F:
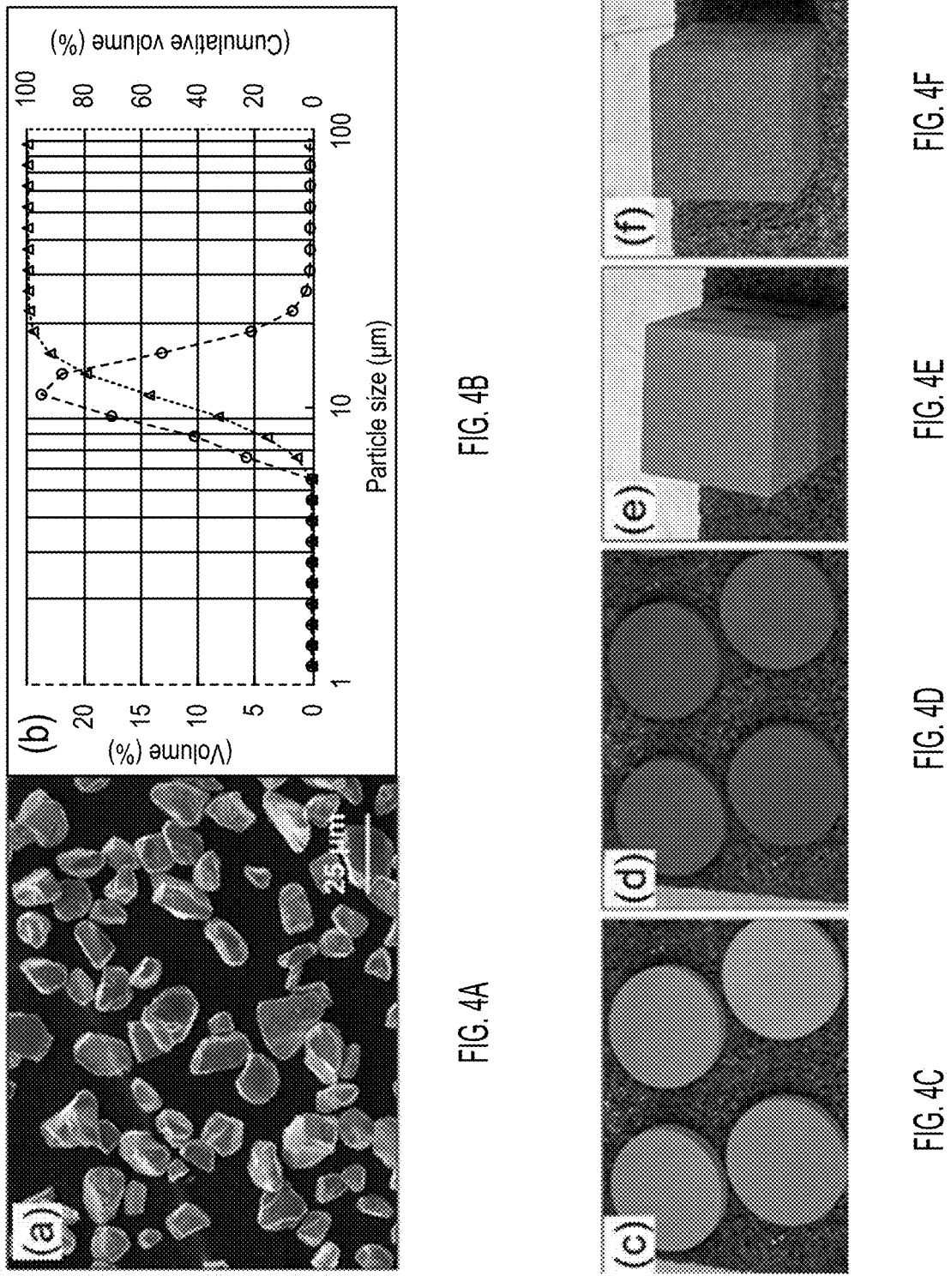
FIGS. 4A-4F show powder characterization and printed samples, according to an example implementation.

FIGS. 4A-4F show powder characterization and printed samples. FIG. 4A shows the powder morphology used for sample printing. FIG. 4B shows the particle size distribution. The powder can have an irregular shape with angular edges. The mean diameter of the volume distribution of the powder can be about 14 μm, and the 50% percentile size ($P_{50}$) can be about 10.4 μm. FIG. 4C shows the printed disk sample. FIG. 4D shows the debound disk sample. FIG. 4E shows the printed channeled sample. FIG. 4F shows the debound channeled sample. The measured densities of the disk samples before and after debinding can be 1.50±0.01 g/cm$^3$ and 1.45±0.01 g/cm$^3$, respectively.

Joining of Disk Samples with Graphite Paper

Figures 5A, 5B, 5C:
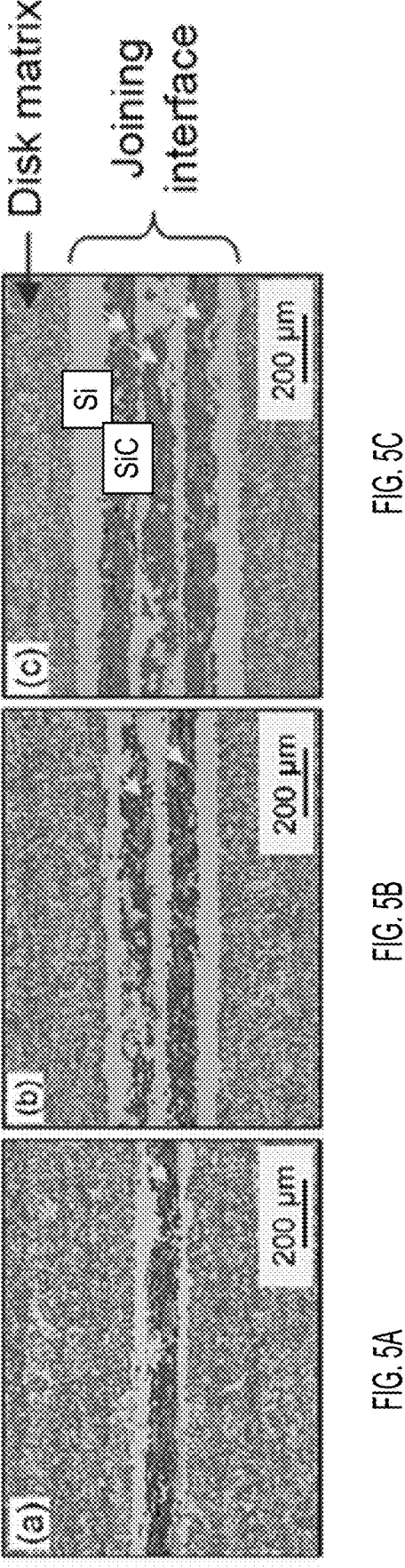
FIGS. 5A-5C show backscattered electron (BSE) images of the interface of the disk samples from Tests G1, G2, and G3, according to an example implementation.

FIGS. 5A-5C show backscattered electron (BSE) images of the interface of the disk samples from Tests G1, G2, and G3. FIG. 5A shows a BSE image of the interface of a disk sample from Test G1, which can have one layer of graphite paper. FIG. 5B shows a BSE image of the interface of a disk sample from Test G2, which can have two layers of graphite paper. FIG. 5C shows a BSE image of the interface of a disk sample from Test G3, which can have three layers of graphite paper.

The layer thickness of the whole interface of the disk sample from Test Gi can be 150 μm. The layer thickness of the whole interface of the disk sample from Test G2 can be 300 μm. The layer thickness of the whole interface of the disk sample from Test G3 can be 450 μm. The interfaces can include a "sandwich" structure, in which layers of synthesized SiC are between layers of silicon. The synthesized SiC layer can be between a Si layer and the two or more parts. The locations of the layers of synthesized SiC can be marked by arrows in FIGS. 5A-5C. The number of layers can depend on the number of pieces of paper (e.g., graphite paper).

The edge surfaces of the printed SiC sample can be rough since no grinding or polishing may be conducted before silicon infiltration. This can lead to some variations of the thickness of the interface. The paper (e.g., graphite paper) as shown in FIG. 3C can be porous, which can result in rough edges of the synthesized SiC layers inside the interface. Small gray dots can be observed on the synthesized SiC layers inside the interface. These can be the synthesized SiC grains from the added silicon particles. Some residual carbon (e.g., dark dots in FIGS. 5A-5C) can be observed inside the interface.

Figures 6A, 6B, 6C, 6D:
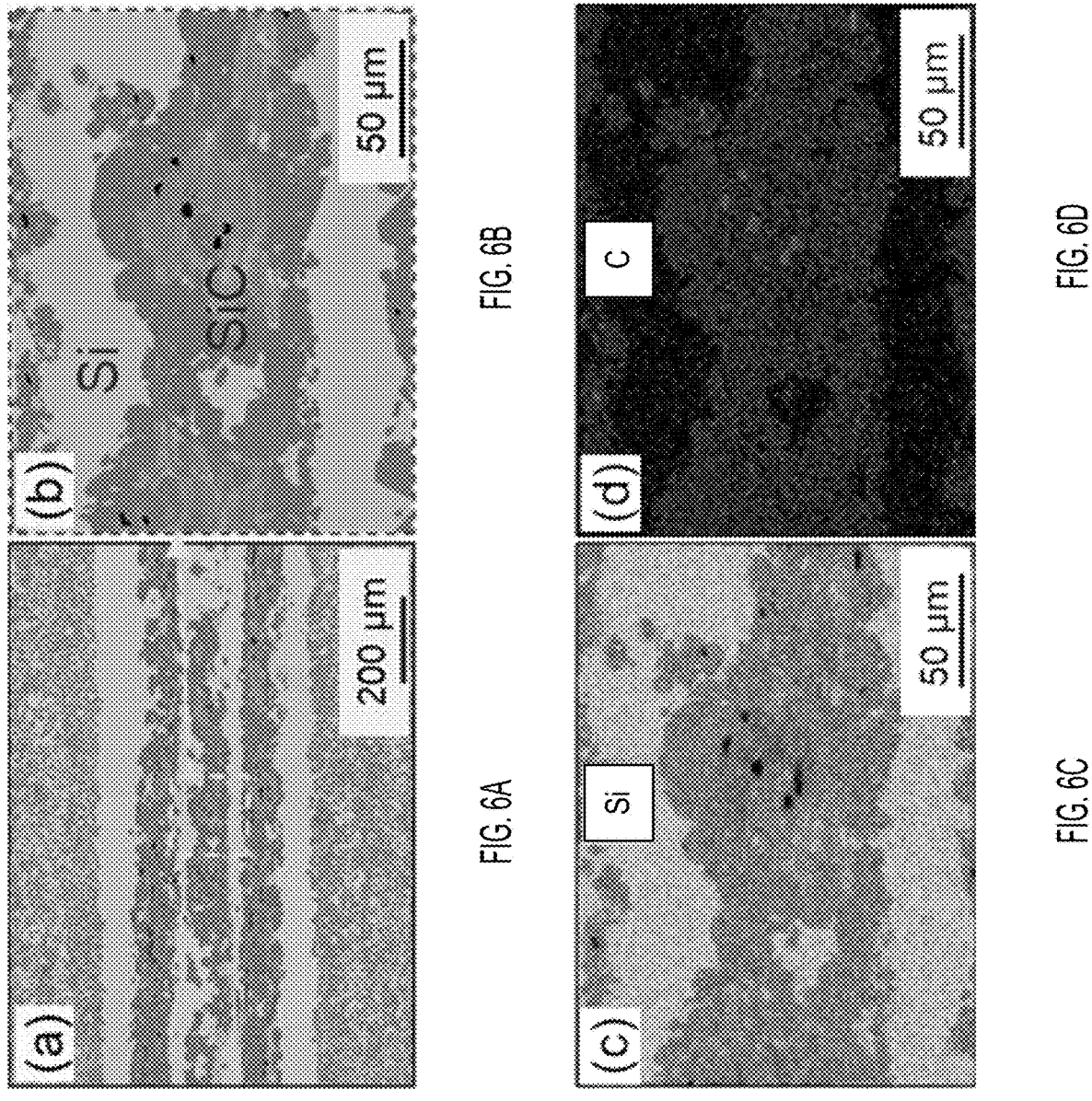
FIGS. 6A-6D show energy dispersive spectroscopy (EDS) map scanning images of the interface of the disk sample from Test G3, according to an example implementation.

FIGS. 6A-6D show energy dispersive spectroscopy (EDS) map scanning images of the interface of the disk sample from Test G3. FIGS. 6A-6D show the EDS map scanning images for the sample from Test G3. As shown in FIG. 6B, some dark dots can be observed inside the synthesized SiC layer, indicating some residual carbon from the graphite paper. FIG. 6C shows an EDS map scanning image of silicon, which shows the residual carbon (dark dots). FIG. 6D shows an EDS map scanning image of carbon, which shows the residual carbon (light dots).

Figure 7:
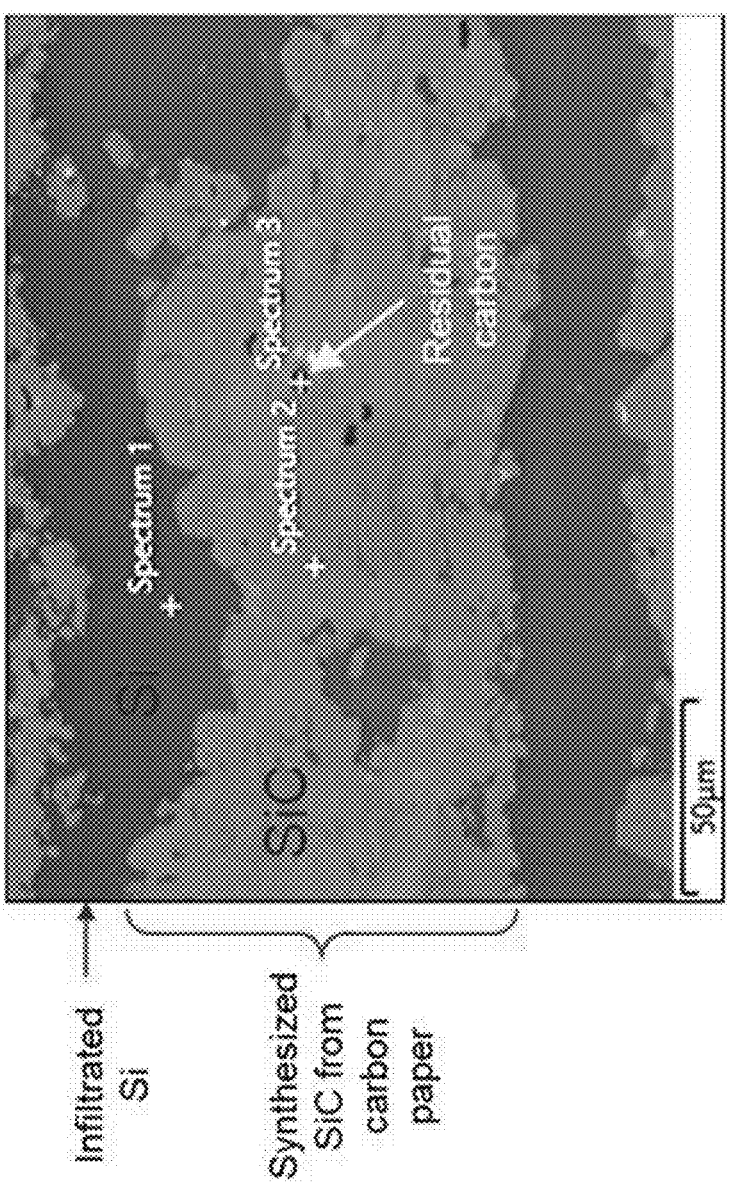
FIG. 7 shows a point EDS scanning image for the partial interface of the disk sample in Test G3, according to an example implementation.

Results of point EDS scanning for the interface of the disk sample in Test G3 are shown in FIG. 7 and Table 3. FIG. 7 shows a point EDS scanning image for the partial interface of the disk sample in Test G3. Spectrum point 1 can include a point on silicon. Spectrum point 2 can include a point on synthesized SiC. Spectrum point 3 can include a point on the residual carbon.

As shown in Table 3, the dark dot areas inside the interface (e.g., graphite paper location) can include the residual carbon. SiC can be synthesized from the reaction of carbon and silicon. The found composition of Spectrum 2 can include SiC. Spectrum 2 can include a higher amount of carbon, which could be due to some residual carbon inside the point scanning area or the limited precision of EDS quantification.

Table 3 shows element composition results for point EDS scanning of the disk sample in Test G3.

| Element composition results for point EDS scanning of the disk sample in Test G3. | | |
|---|---|---|
| Scanning point | Si (wt %) | C (wt %) |
| Spectrum 1 | 96.6 | 3.4 |
| Spectrum 2 | 67.3 | 32.7 |
| Spectrum 3 | 0.5 | 99.5 |

Figure 8:
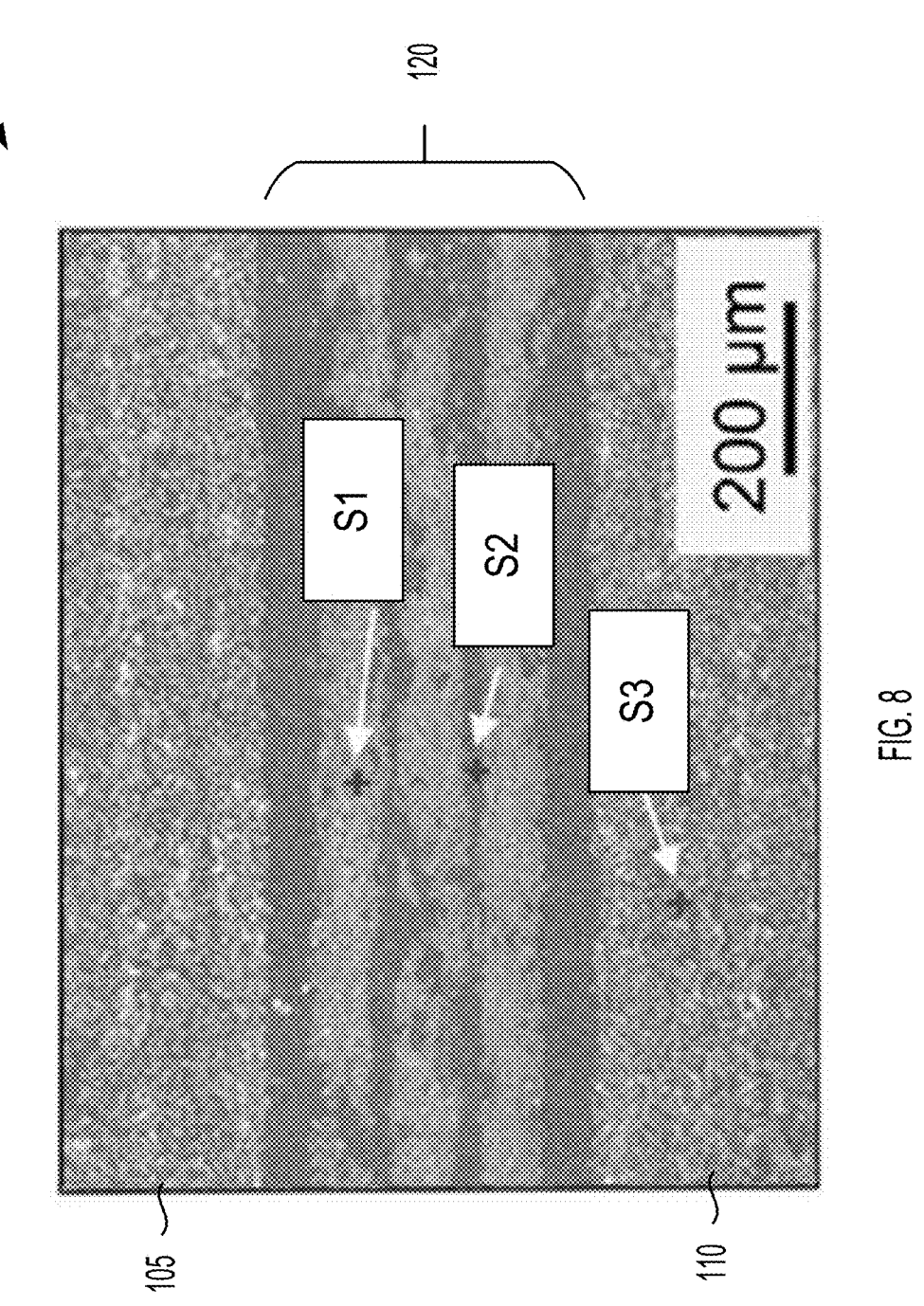
FIG. 8 shows three locations of X-ray crystallography scanning for a disk sample in Test G3, according to an example implementation.

High-energy micro-diffraction can be conducted at Argonne National Laboratory's Advanced Photon Source (Sector 33). Three locations can be scanned, as shown in FIG. 8. FIG. 8 shows three locations of X-ray crystallography scanning for the disk sample in Test G3. Point S1 (e.g., S1 location) can be on the synthesized SiC area (e.g., from graphite paper). Point S2 (e.g., S2 location) can be between two layers of synthesized SiC. Point S3 (e.g., S3 location) can be on the disk matrix (e.g., outside of the interface).

A system 800 (e.g., disk sample) can include two or more parts. For example, the system 800 can include a first disk (e.g., first part 105) and a second disk (e.g., second part 110). The first part 105 can include a carbide. For example, the first part 105 can include silicon carbide. The first part 105 can include tungsten carbide. The first part 105 can include a ceramic. The second part 110 can include silicon carbide. The second part 110 can include tungsten carbide. The second part 110 can include a ceramic. The second part 110 can be coupled with the first part 105. For example, the second part 110 can be joined with the first part 105. The first part 105 can be joined with the second part 110. The first part 105 can be joined with the second part 110 by layers of Si and SiC. The system 800 can include the joining layer 120 (e.g., interface layer, interface, joint) The joining layer 120 can be disposed between the two or more parts. The joining layer 120 can be disposed between the first part 105 and the second part 110. The joining layer 120 can include one or more layers of silicon (Si). The joining layer 120 can include one or more layers of silicon carbide (SiC). The joining layer 120 and the first part 105 can have the same composition. The joining layer 120 and the second part 110 can have the same composition. The joining layer 120 can be homogenous or heterogenous.

The two or more parts can include graphite, carbon, tungsten, boron, silicon carbide, tungsten carbide, titanium carbide, and boron carbide, aluminum oxide, aluminum nitride, and/or boron nitride. The first part 105 can include graphite, carbon, tungsten, boron, silicon carbide, tungsten carbide, titanium carbide, and boron carbide, aluminum oxide, aluminum nitride, and/or boron nitride. The second part 110 can include graphite, carbon, tungsten, boron, silicon carbide, tungsten carbide, titanium carbide, and boron carbide, aluminum oxide, aluminum nitride, and/or boron nitride.

The joining layer 120 can have a thickness in a range of 20 μm to 600 μm. For example, the layer can have a thickness in a range of 20 μm to 30 μm, 20 μm to 40 μm, 20 μm to 50 μm, 20 μm to 100 μm, 20 μm to 150 μm, 20 μm to 200 μm, 20 μm to 300 μm, 20 μm to 400 μm, 20 μm to 500 μm, 20 μm to 600 μm, 30 μm to 40 μm, 30 μm to 50 μm, 30 μm to 100 μm, 30 μm to 150 μm, 30 μm to 200 μm, 30 μm to 300 μm, 30 μm to 400 μm, 30 μm to 500 μm, 30 μm to 600 μm, 40 μm to 50 μm, 40 μm to 100 μm, 40 μm to 150 μm, 40 μm to 200 μm, 40 μm to 300 μm, 40 μm to 400 μm, 40 μm to 500 μm, 40 μm to 600 μm, 50 μm to 100 μm, 50 μm to 150 μm, 50 μm to 200 μm, 50 μm to 300 μm, 50 μm to 400 μm, 50 μm to 500 μm, 50 μm to 600 μm, 100 μm to 150 μm, 100 μm to 200 μm, 100 μm to 300 μm, 100 μm to 400 μm, 100 μm to 500 μm, 100 μm to 600 μm, 150 μm to 200 μm, 150 μm to 300 μm, 150 μm to 400 μm, 150 μm to 500 μm, 150 μm to 600 μm, 200 μm to 300 μm, 200 μm to 400 μm, 200 μm to 500 μm, 200 μm to 600 μm, 300 μm to 400 μm, 300 μm to 500 μm, 300 μm to 600 μm, 400 μm to 500 μm, 400 μm to 600 μm, or 500 μm to 600 μm.

The joining layer can be formed via liquid silicon infiltration. Liquid silicon infiltration can include a reactive melt infiltration technique. For example, liquid silicon infiltration can include forming a ceramic matrix as a result of a chemical reaction between the silicon and the source material 115.

The first part 105 can include one or more first channels. The second part 110 can include one or more second channels. The one or more first channels can be configured to couple with the one or more second channels. The first part 105 can be porous. The second part 110 can be porous.

Figure 9:
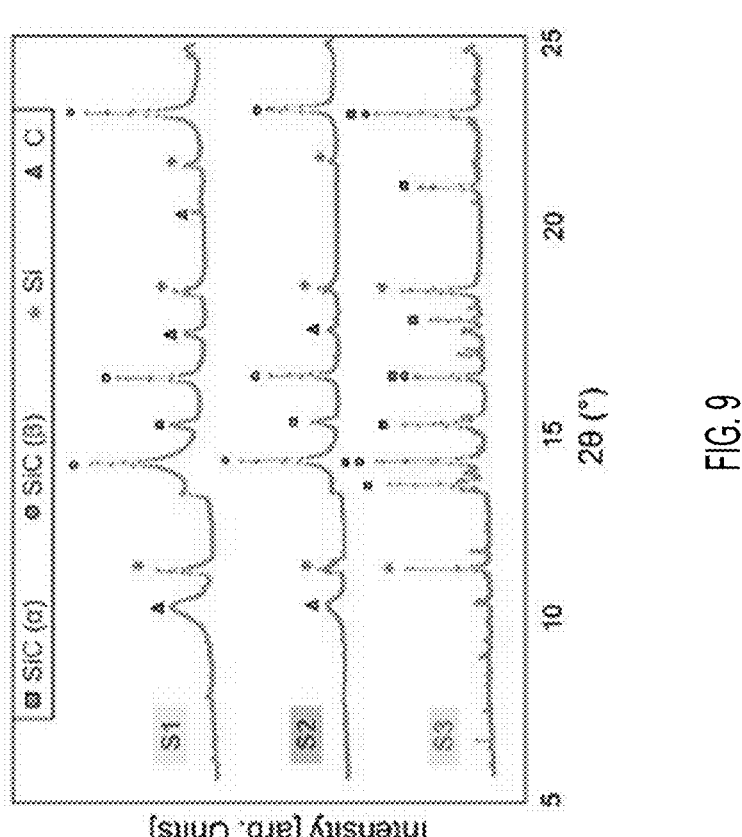
FIG. 9 shows a plot of high energy X-ray diffraction patterns of three scanning points for disk sample in Test G3, according to an example implementation.

Scanning and analysis results are shown in FIG. 9. FIG. 9 shows a plot 900 of high energy X-ray diffraction patterns of three scanning points for disk sample in Test G3. The S1 location can primarily show 3C-SiC (β), silicon, and carbon. Since the infiltration temperature can be 1550° C., 3C-SiC (β) can be formed from the reaction between the graphite paper and infiltrated silicon, and the formed silicon carbide can stay as 3C (β) phase at this temperature. Moreover, since the graphite paper can be porous, silicon can infiltrate and fill the pores of the graphite paper, leaving silicon phase inside the graphite paper layers. Residual carbon can be observed in the graphite paper layers. This finding can be related to the kinetics of the chemical reaction between Si (e.g., silicon) and C and the transport of liquid Si. It can take time for carbon to react with liquid Si and form SiC. A higher temperature may be needed to accelerate the diffusion transport.

The S2 location can primarily show silicon, 3C-SiC (β), and some carbon. Since this location is between two graphite papers, silicon can be primarily observed. The reason for observing 3 C-SiC (β) and residual carbon can be the relatively large beam size (e.g., 30 μm) of the X-ray. Due to the resolution limit of the scanning, the S2 point scanning may include material information from the graphite paper layers. Compared with S1, the residual C phase can be less in S2 as this scanning can be mainly located between two graphite papers.

The S3 location can primarily show 6H-SiC (α) and silicon because the SiC powder used for the disk preform can have a 6H-SiC (α) phase. As the printed sample from binder jetting can be porous, silicon can infiltrate into the pores of the matrix. Due to the pyrolysis of phenolic binder used for binder jetting printing, some carbon can be introduced into the disk sample. Therefore, some 3C-SiC (β) (and residual carbon) could have existed in this location. Based on intensity estimation, the phase percentage of 3C-SiC (β) can be less than 5%.

Figures 10A, 10B:
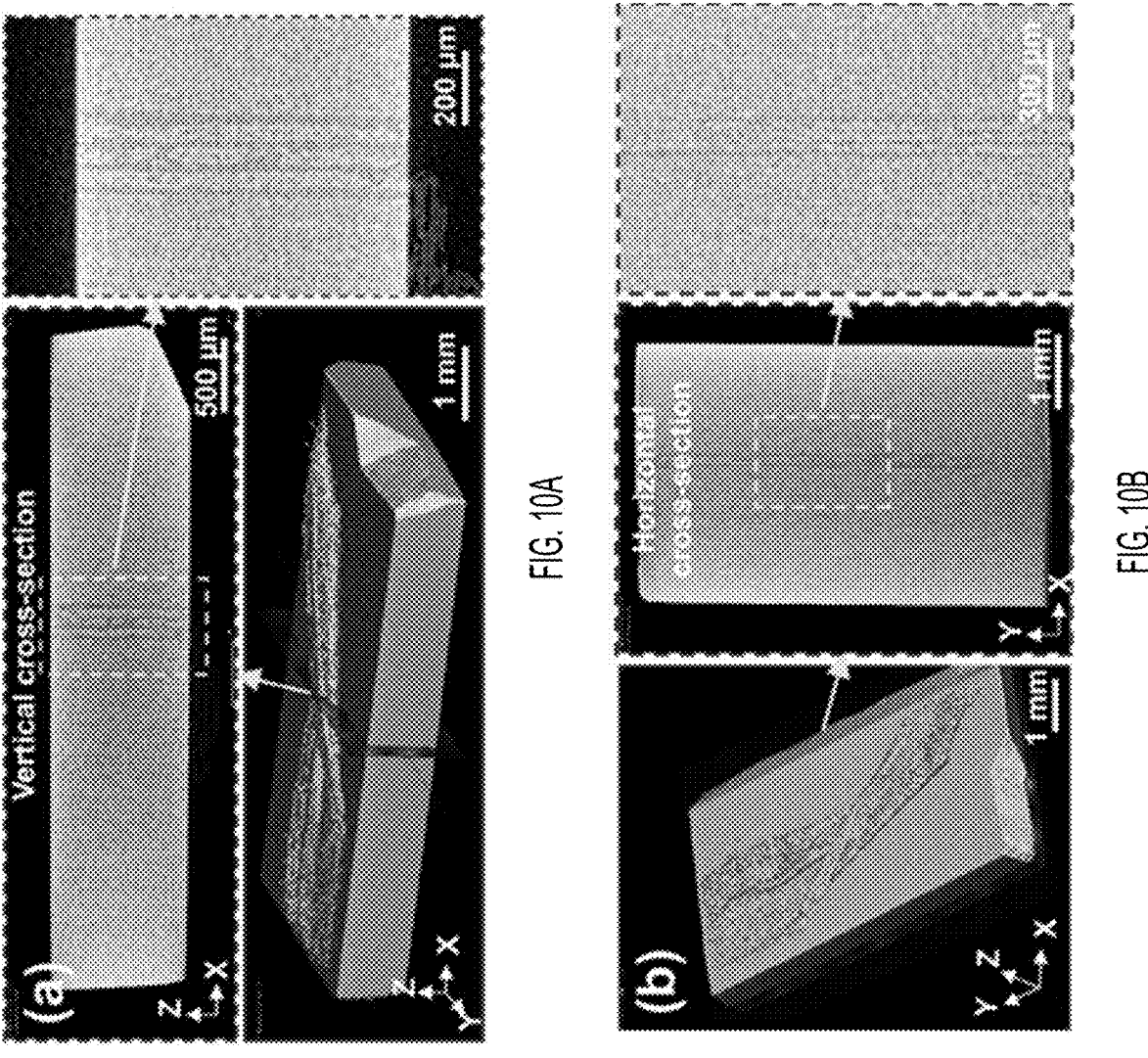
FIGS. 10A and 10B show a micro-CT assessment of the joined interface from the sample in Test G3, according to an example implementation.

FIGS. 10A and 10B presents the micro-CT results of the joint interface. FIG. 10A shows the side view of the joined interface at the vertical cross-section location of the sample from G3. FIG. 10A shows a vertical cross-section in the middle area of the sample. FIG. 10B shows the top view of the joined interface at the horizontal cross-section location of the sample. FIG. 10B shows a horizontal cross-section in the middle area of the sample. The computer tomography experiment can indicate that a robust joining was achieved between the two disk samples. No cracks or disjoined surfaces may be observed in the joined interface. The 3D information can indicate that the concurrent approach is a viable method and shows promise for industrial applications.

Joining of Disk Samples with Parchment Paper.

Figures 11A, 11B, 11C, 11D:
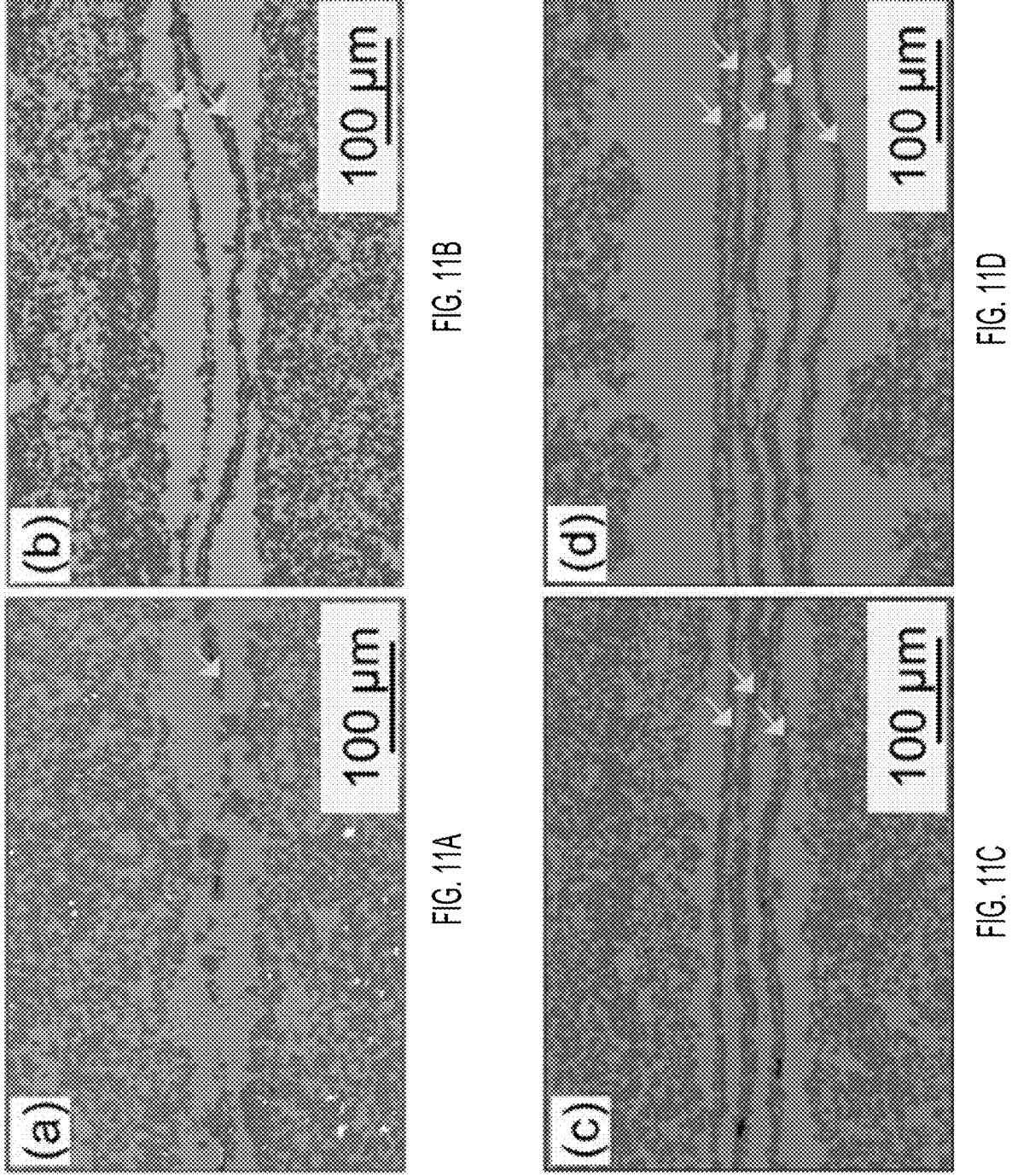
FIGS. 11A-11D show the backscattered electron microscopy images for the sample from Tests P1-P4, according to an example implementation.

FIGS. 11A-11D show the backscattered electron microscopy images for the sample from Tests P1-P4. FIG. 11A shows the BSE image for the sample from Test P1. The sample from Test P1 can have one layer of parchment paper. The thickness of the interface of the sample from Test P1 can be 60 μm. FIG. 11B shows the BSE image for the sample from Test P2. The sample from Test P2 can have two layers of parchment paper. The thickness of the interface of the sample from Test P2 can be 80 μm. FIG. 11C shows the BSE image for the sample from Test P3. The sample from Test P3 can have three layers of parchment paper. The thickness of the interface of the sample from Test P3 can be 100 μm. FIG. 11D shows the BSE image for the sample from Test P4. The sample from Test P4 can have five layers of parchment paper. The thickness of the interface of the sample from Test P4 can be 200 μm. The locations of the parchment paper layers can be marked by arrows. Some variation of the interface thickness can be observed. The interfaces can include of a "sandwich" structure, in which layers of synthesized SiC are between layers of silicon. The synthesized SiC layer can be between a Si layer and the two or more parts. The locations of the layers of synthesized SiC can be marked by arrows in FIG. 11. The number of layers can depend on the number of pieces parchment paper. Some residual carbon can be observed inside the interface (shown as dark dots in FIG. 11).

Figures 12A, 12B, 12C, 12D:
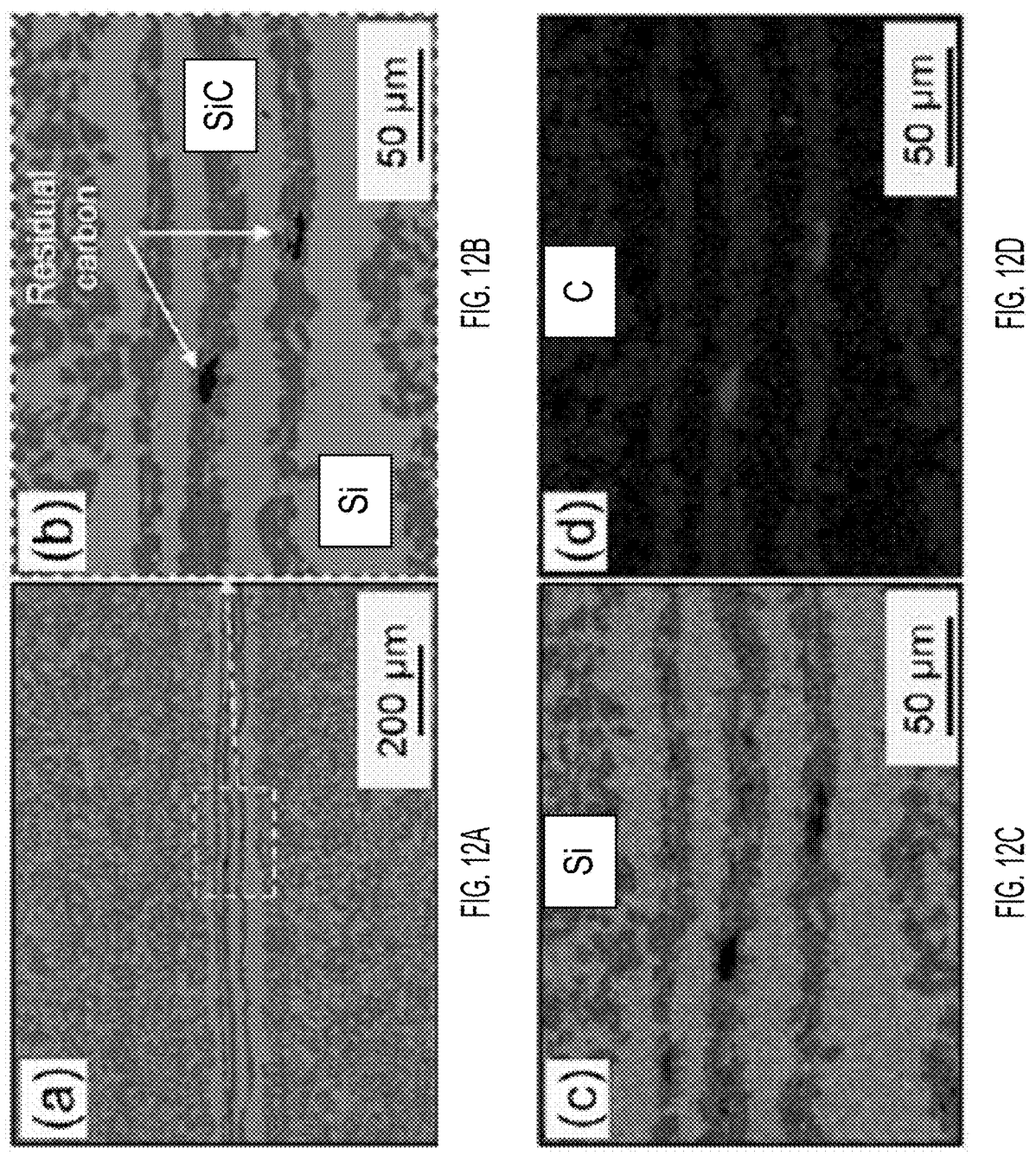
FIGS. 12A-12D show EDS map scanning images of the interface of the disk sample from Test P3, according to an example implementation.

FIGS. 12A-12D show EDS map scanning images of the interface of the disk sample from Test P3. FIGS. 12A-12D show the EDS map scanning images for the sample from Test P3. FIG. 12C shows an EDS map scanning image of silicon, which shows residual carbon (dark dots). FIG. 12D shows an EDS map scanning image of carbon, which shows residual carbon (light dots). FIGS. 12C and 12D show the "sandwich" structure of the interface, in which infiltrated silicon can be between synthesized SiC layers.

Figure 13:
FIG. 13 shows a line scanning plot of the partial interface of the sample from Test P3, according to an example implementation.
Figure 13:
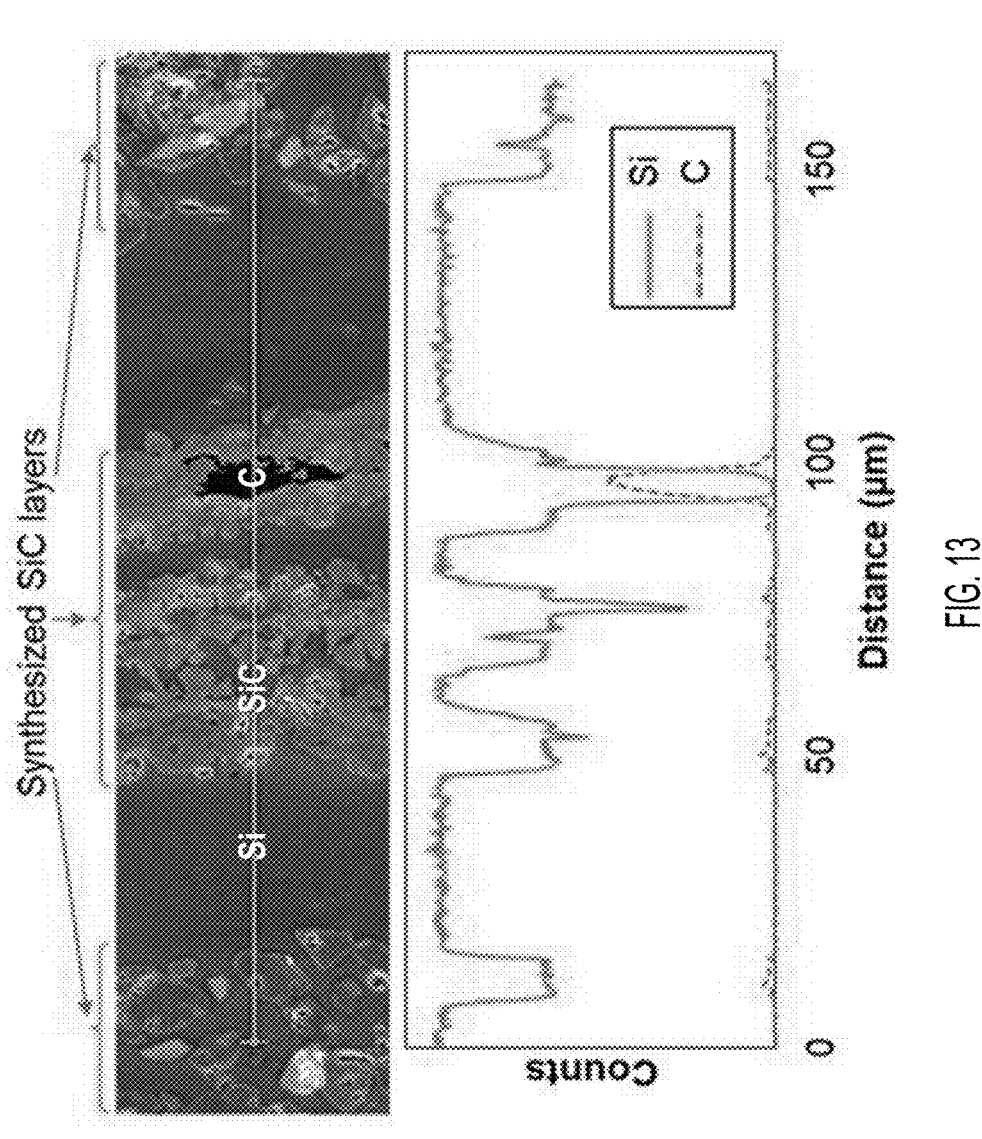

A line scanning can be conducted at the interface of the sample from Test P3, as shown in FIG. 13. FIG. 13 shows a line scanning plot 1300 of the partial interface of the sample from Test P3. Both silicon and carbon can be in the synthesized layer. Silicon can be primarily observed between the SiC layers. Residual carbon can lead to increased carbon counts and decreased silicon counts in the scanning.

Joining of Channeled Samples.

FIGS. 14A-14E show channeled samples. Two 1-inch channeled samples can be joined with one layer of graphite paper and a weight. The samples before joining are shown in FIG. 14A. The graphite paper before joining is shown in FIG. 14B. After joining, the two samples can be successfully joined (shown in FIG. 14C). As shown in the SEM image in FIG. 14D, no cracks or non-joined area may be observed in the interface. The interface can be about 200 μm in thickness, slightly higher than that of a disk joining (Test G1). This may be due to the rough edge of the holes of the graphite paper that led to rough contact between the channeled sample and the paper. FIG. 14E presents the EDS scanning of carbon in the interface, and the bright dots in the middle can indicate some residual carbon inside the synthesized layer of SiC, while the dark area can indicate the infiltrated silicon.

If a channel is blocked by the melt silicon, the infiltration height can be controlled to prevent the blockage. The infiltration height can be controlled by modeling the capillary force. The samples can be secured to prevent sliding during infiltration, which can prevent misalignment of the channels.

Additively manufactured silicon carbide samples from binder jetting can be concurrently joined and densified by liquid silicon infiltration. Disk samples can be joined first with graphite or parchment paper as the interlayer material (e.g., carbon source for SiC formation). The joined and densified disk samples by graphite paper (1-3 layers) can have an interface thickness of about 150-500 μm, depending on the number of added graphite paper layers. The joined and densified disk samples by parchment paper (1-5 layers) can have an interface thickness of about 60-200 μm, also depending on the number of added parchment paper layers. To experimentally investigate the synthesized structure inside the interface, high-energy X-ray micro-diffraction can be conducted on the interface layer from disk sample with graphite paper, which showed the formation of 3C-SiC (β) from the reaction of silicon and added carbon source. The methods can join printed samples with channels to prove the capability for joining parts with complex geometries. This concurrent approach of joining and densification can enable efficiency improvements of fabricating silicon carbide parts with complicated geometries and widens geometry freedom for additive manufacturing of silicon carbide.

Figure 15:
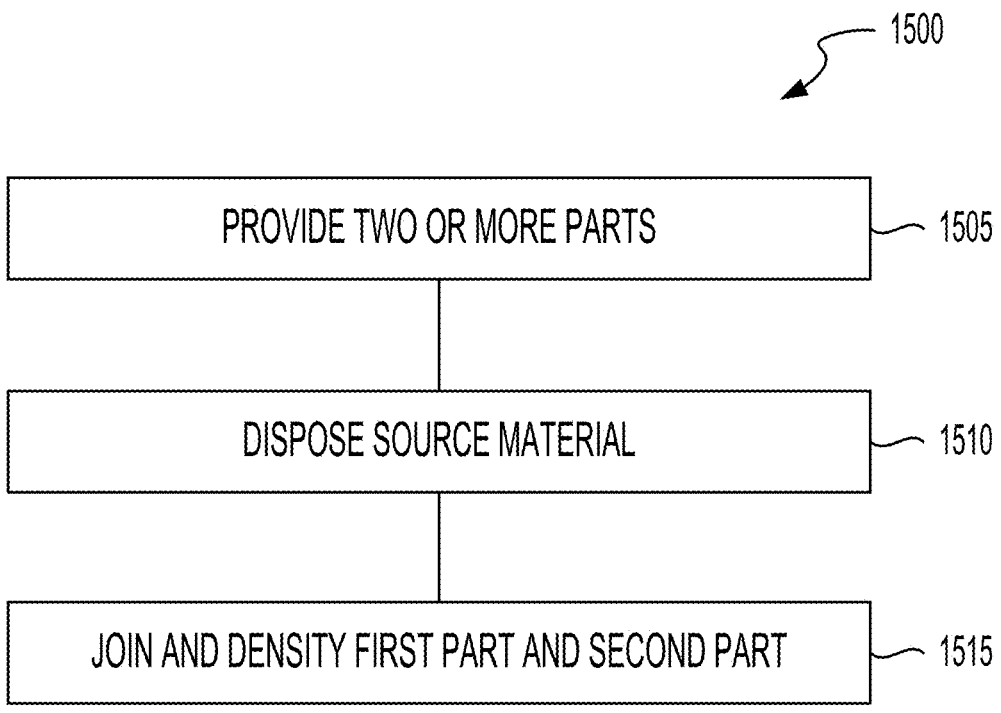
FIG. 15 shows a method of concurrently joining and densifying two or more parts, according to an example implementation.

FIG. 15 shows a method 1500 of concurrently joining and densifying two or more parts. The method 1500 can include providing two or more parts (BLOCK 1505). The method 1500 can include disposing a source material (BLOCK 1510). The method 1500 can include joining and densifying the first part and the second part (BLOCK 1515).

The method 1500 can include providing two or more parts (BLOCK 1505). For example, the method 1500 can include providing a first part and a second part. The method 1500 can include providing the first part, the second part, and a third part. The method 1500 can include providing the first part, the second part, the third part, and a fourth part. The two or more parts can include the first part and the second part. The two or more parts can include the first part, the second part, and the third part. The two or more parts can include the first part, the second part, the third part, and the fourth part. The two or more parts can include more than four parts. The two or more parts can include any number of parts that can be joined together. The two or more parts can be made of a material (e.g., matrix material). The two or more parts can be porous.

The two or more parts can include silicon carbide. For example, the first part can include silicon carbide. The second part can include silicon carbide. The first part and the second part can be made of the same material. The first part and the second part can have the same composition. The first part and the second part can be made of different materials. The first part and the second part can have different compositions.

The two or more parts can form a hollow structure. For example, the first part and the second part can form a hollow structure. The first part and the second part, when joined, can form the hollow structure. The two or more parts can form a structure with one or more overhangs. The two or more parts can form an angled structure. The two or more parts can form a bridge structure. The two or more parts can form a one or more tunnels. The two or more parts can form one or more chambers. The two or more parts can include one or more passages.

The two or more parts can include at least one of a metal, a ceramic, a polymer, or sand. For example, the first part can include at least one of a metal, a ceramic, a polymer, or sand. The second part can include at least one of a metal, a ceramic, a polymer, or sand.

The two or more parts can include one or more channels. For example, the first part can include one or more first channels. The second part can include one or more second channels. The one or more first channels can be configured to couple with the one or more second channels. For example, the one or more first channels can be joined with the one or more second channels. The one or more first channels can be aligned with the one or more second channels. The one or more first channels and the one or more second channels can have the same dimensions. The one or more first channels and the one or more second channels can have different dimensions.

The method 1500 can include disposing a source material (BLOCK 1510). For example, the method 1500 can include disposing the source material between the two or more parts. The method 1500 can include disposing the source material between the first part and the second part. The method 1500 can include disposing the source material between the first part and the third part. The method 1500 can include disposing the source material between the second part and the third part. The method 1500 can include disposing the source material between the first part and the fourth part. The method 1500 can include disposing the source material between the second part and the fourth part. The method 1500 can include disposing the source material between the third part and the fourth part. The source material can include silicon carbide. The source material can include carbon. The source material can include paper. For example, the source material can include carbon paper (e.g., graphite paper) or parchment paper.

The source material can be disposed between the two or more parts such that the source material does not block the channels of the two or more parts. For example, the source material can be disposed between the first part and the second part such that the source material does not block the one or more second channels and the one or more second channels.

The method 1500 can include joining and densifying the first part and the second part (BLOCK 1515). The method 1500 can include joining and densifying the two or more parts. For example, the method 1500 can include joining and densifying the first part and the second part by reacting a liquid with the source material. The liquid (e.g., liquid metal, infiltrant, infiltrant liquid, infiltrant material, infiltrant liquid metal, etc.) can react with the source material. The liquid can include silicon. The liquid can react with the source material to form an interface layer. The liquid can react with the source material to form a material that has the same composition as that of the first part. The liquid can react with the source material to form a material that has the same composition as that of the second part. The liquid can react with the source material to form a material that has the same composition as that of the third part. The liquid can react with the source material to form a material that has the same composition as that of the fourth part. The formed material can adhere to both parts being joined. The formed material can bond the parts. The infiltrant can penetrate into the pores of the parts. The infiltrant can wet the matrix. After cooling and subsequent solidification, this infiltrant material can bond the parts together. The infiltrant can bond the particles inside the matrix.

The two or more parts can be joined by forming a joining layer between the two or more parts. For example, the first part can be joined with the second part by forming a joining layer between the first part and the second part. The two or more parts can be densified. For example, the density of the two or more parts can increase after densification. Densification can increase the density of the first part. Densification can increase the density of the second part.

The method 1500 can include forming a layer between the two or more parts. For example, the method 1500 can include forming a layer between the first part and the second part. The layer can include a ceramic. The layer can include silicon carbide. The first part and the layer can be made of the same material. For example, the first part and the layer can have the same composition. The second part can be made of the same material. For example, the second part and the layer can have the same composition.

The layer can have a thickness in a range of 20 µm to 600 µm. For example, the layer can have a thickness in a range of 20 µm to 30 µm, 20 µm to 40 µm, 20 µm to 50 µm, 20 µm to 100 µm, 20 µm to 150 µm, 20 µm to 200 µm, 20 µm to 300 µm, 20 µm to 400 µm, 20 µm to 500 µm, 20 µm to 600 µm, 30 µm to 40 µm, 30 µm to 50 µm, 30 µm to 100 µm, 30

μm to 150 μm, 30 μm to 200 μm, 30 μm to 300 μm, 30 μm to 400 μm, 30 μm to 500 μm, 30 μm to 600 μm, 40 μm to 50 μm, 40 μm to 100 μm, 40 μm to 150 μm, 40 μm to 200 μm, 40 μm to 300 μm, 40 μm to 400 μm, 40 μm to 500 μm, 40 μm to 600 μm, 50 μm to 100 μm, 50 μm to 150 μm, 50 μm to 200 μm, 50 μm to 300 μm, 50 μm to 400 μm, 50 μm to 500 μm, 50 μm to 600 μm, 100 μm to 150 μm, 100 μm to 200 μm, 100 μm to 300 μm, 100 μm to 400 μm, 100 μm to 500 μm, 100 μm to 600 μm, 150 μm to 200 μm, 150 μm to 300 μm, 150 μm to 400 μm, 150 μm to 500 μm, 150 μm to 600 μm, 200 μm to 300 μm, 200 μm to 400 μm, 200 μm to 500 μm, 200 μm to 600 μm, 300 μm to 400 μm, 300 μm to 500 μm, 300 μm to 400 μm to 500 μm, 400 μm to 600 μm, or 500 μm to 600 μm.

The method 1500 can include forming the two or more parts via additive manufacturing. Additive manufacturing can include 3D printing. For example, the method 1500 can include forming the first part via additive manufacturing. The method 1500 can include forming the second part via additive manufacturing. The method 1500 can include forming the two or more parts via pressing. For example, the method 1500 can include forming the first part via pressing. The method 1500 can include forming the second part via pressing. The method 1500 can include forming the two or more parts via machining. For example, the method 1500 can include forming the first part via machining. The method 1500 can include forming the second part via machining.

The method 1500 can include forming components or devices from the two or more parts. For example, the method 1500 can include forming a heat exchanger from the two or more parts. The method 1500 can include forming components or devices from the first part and the second part. For example, the method 1500 can include forming a heat exchanger from the first part and the second part. The method 1500 can include forming a burner (e.g., recuperative burner) from the two or more parts. The method 1500 can include forming armor (e.g., body armor) from the two or more parts. The method 1500 can include forming thermal parts with complex channels from the two or more parts. The method 1500 can include forming bone tissues with complex geometries from the two or more parts.

Figures 16, 17:
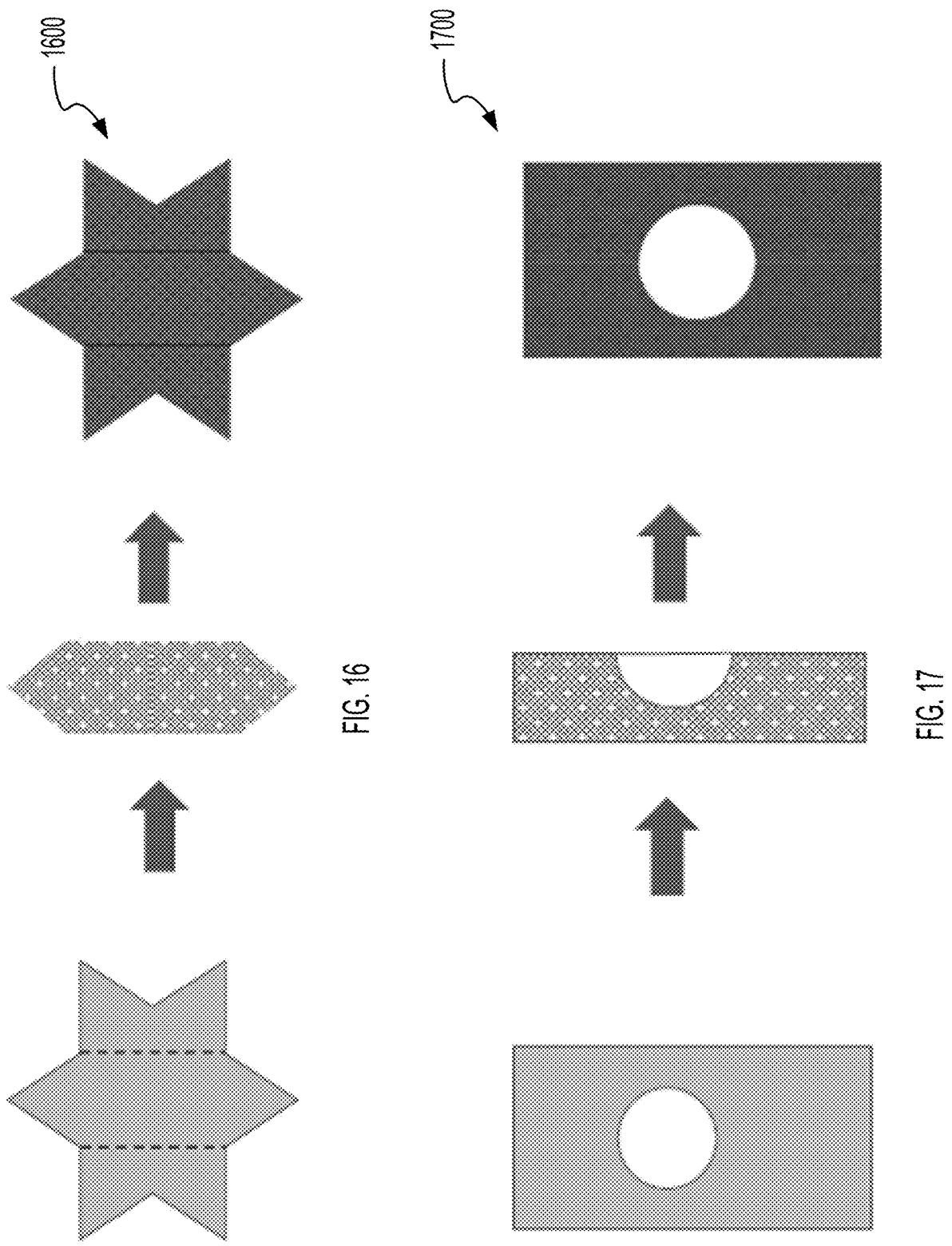
FIG. 16 shows a process of concurrent reaction-bonded joining and densification, according to an example implementation.
FIG. 17 shows a process of concurrent reaction-bonded joining and densification, according to an example implementation.

FIG. 16 shows a process 1600 of concurrent reaction-bonded joining and densification. The design can be sliced into several parts (e.g., two or more parts). The two or more parts can be designed separately. The two or more parts can be printed (e.g., via additive manufacturing) separately. The two or more parts can be joined together using a concurrent approach. For example, the two or more parts can be concurrently reaction-bonded joined and densified. This can be useful for designs with complex or large geometries (e.g., angles, overhangs, bridges).

FIG. 17 shows a process 1700 of concurrent reaction-bonded joining and densification. The design can be sliced into several parts (e.g., two or more parts). The two or more parts can be designed separately. The two or more parts can be printed (e.g., via additive manufacturing) separately. The two or more parts can be de-powdered separately. The two or more parts can be joined together using a concurrent approach. For example, the two or more parts can be concurrently reaction-bonded joined and densified. This can be useful because de-powdering of additively manufactured parts with internal geometries can be difficult for long, thin, and/or turned channels inside or even impossible for hollow structures.

Definitions

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method, comprising:
providing two or more parts, the two or more parts comprising a first part and a second part;
disposing a source material comprising a plurality of layers of carbon paper between the first part and the second part; and
joining and densifying the first part and the second part by reacting a liquid comprising silicon with the source material to form a joint between the first part and the second part, the joint comprising alternating layers of silicon and silicon carbide.

2. The method of claim 1, wherein the first part comprises silicon carbide and the second part comprises silicon carbide.

3. The method of claim 1, wherein the first part comprises one or more first channels and the second part comprises one or more second channels, the one or more first channels configured to couple with the one or more second channels.

4. The method of claim 1, wherein the first part and the second part are porous.

5. The method of claim 1, wherein the joint comprises a ceramic.

6. The method of claim 1, wherein the joint has a thickness in a range of 20 µm to 600 µm.

7. The method of claim 1, further comprising forming the first part and the second part via at least one of additive manufacturing, pressing, or machining.

8. The method of claim 1, wherein the first part and the second part form a hollow structure.

9. The method of claim 1, wherein the first part and the second part comprises at least one of a metal, a ceramic, a polymer, or sand.

10. The method of claim 1, further comprising forming a heat exchanger from the first part and the second part.

11. The method of claim 1, wherein the first part comprises one or more first channels and the second part comprises one or more second channels, the one or more first channels configured to be aligned with the one or more second channels.

12. The method of claim 1, wherein the joint has a thickness in a range of 200 µm to 600 µm.

13. The method of claim 1, wherein the carbon paper provides a source of carbon for the silicon carbide in the joint.

14. The method of claim 1, wherein the liquid comprises copper.

15. The method of claim 1, wherein the liquid comprises magnesium.

16. The method of claim 1, wherein the liquid comprises aluminum.

17. The method of claim 1, wherein a thickness of the joint is based on a number of the plurality of layers of carbon paper.

18. The method of claim 1, wherein a thickness of the joint is greater than a thickness of the silicon.

19. The method of claim 1, wherein a thickness of the joint is greater than a thickness of the silicon carbide.

20. The method of claim 1, wherein the two or more parts comprises a third part, the method comprising:
disposing the source material between the second part and the third part; and joining and densifying the second part and the third part by reacting the liquid with the source material.

* * * * *